UNITED STATES PATENT OFFICE.

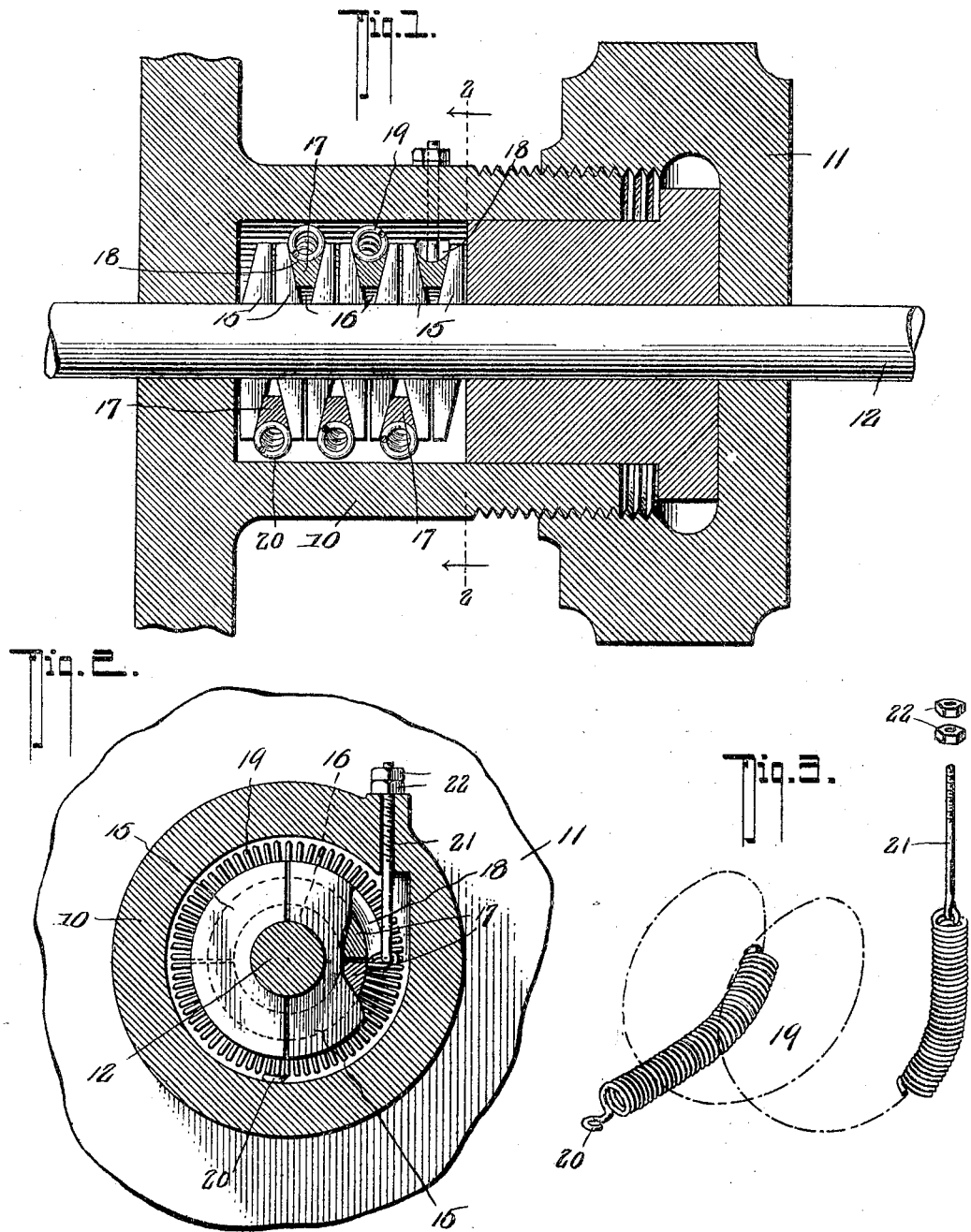

CYRIL CHARLES MASON, OF WILKESBARRE, PENNSYLVANIA.

PISTON-ROD PACKING.

No. 798,199.　　　Specification of Letters Patent.　　　Patented Aug. 29, 1905.

Application filed December 22, 1904. Serial No. 237,970.

*To all whom it may concern:*

Be it known that I, CYRIL CHARLES MASON, a subject of the King of England, residing at Wilkesbarre, in the county of Luzerne and State of Pennsylvania, have invented a new and useful Piston-Rod Packing, of which the following is a specification.

This invention relates to packing, and has for its principal object to provide a novel form of packing adapted especially for use in connection with piston-rods.

A further object of the invention is to construct a packing which may be readily adjusted when worn without opening the stuffing-box and without turning the gland-nut.

A still further object of the invention is to provide a packing in which one of the packing members extends to the outside of the stuffing-box and is provided with readily-accessible means of adjustment in order to compensate for wear.

A still further object of the invention is to provide a novel form of packing which may be adjusted circumferentially, as well as compressed longitudinally.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a sectional elevation of a packing constructed in accordance with the invention. Fig. 2 is a transverse sectional view of the same on the line 2 2 of Fig. 1. Fig. 3 is a detail perspective view of the adjustable helix for exerting pressure circumferentially of the packing.

Similar numerals of reference are employed to indicate corresponding parts throughout the several figures of the drawings.

The stuffing-box 10 is of the ordinary construction and is provided with a gland-nut 11 for compressing the packing in the direction of the length of the piston-rod 12. Arranged within the stuffing-box and encircling the piston-rod is a sectional helix 15, formed of any suitable metal, the adjacent walls of said helix being inclined to form tapering openings 16, that are approximately V-shaped. The sections of the helix are each approximately semicircular and when in position a continuous tapered helical channel is formed. In this channel is placed a second helix 17, the contour of which corresponds to that of the helical recess, and this second helix forms a wedge which when the members thereof are forced inward in the direction of the piston-rod will bind the sections of the packing-helix 15.

The outer faces of the sections of the helix 17 are provided with curved grooves or channels 18 for the reception of an adjusting-helix 19, which may be formed of a helically-wound coil of wire. One end of the adjusting-helix is secured to a fixed support 20 within the stuffing-box, and the opposite end thereof is connected to an eyebolt 21, that extends out through an opening in the stuffing-box and receives an adjusting-screw 22 at a point outside the box. When the packing is to be adjusted, the nut 22 is turned in one direction or the other, and by tightening the nut the adjusting-helix may be clamped more firmly around the helix 17 and the members of the packing pressed firmly together. In addition to this circumferential adjustment tending to evenly compress the packing around the piston-rod said packing may also be adjusted by the ordinary gland-nut 11, so that the packing may be adjusted not only by tightening of its circumferential band, but also in a direction of the length of the piston-rod.

While the invention has been described as applicable more especially to piston-rods, it will be understood that it may also be employed in the packing of various other devices without departing from the invention.

Having thus described the invention, what is claimed is—

1. The combination with a packing, of a contractible member surrounding the same, and means for adjusting said member in the direction of its length.

2. The combination with packing members, of a helically-arranged contractible member, and means for adjusting the same in the direction of its length.

3. The combination with packing members, of a contractible member wound helically around said packing members, and means for adjusting said contractible member in the direction of its length.

4. The combination with a helically - arranged packing member, of a sectional strip intercoiled therewith, and means for contracting said sectional strip.

5. The combination with a helically-wound packing member, of a sectional strip, intercoiled therewith, an elastic member engaging the sectional member, and means for adjusting said elastic member in the direction of its length.

6. The combination with packing members, of a compressing member wound helically around said packing members, and means for exerting tensional strain on said compressing member.

7. A packing compressing member formed of a helically-wound strip of elastic material, and means for exerting tensional strain thereon.

8. A packing compressing device including a helically-wound elastic member, means for securing one end of the same, and means connected to the opposite end of said member for exerting longitudinal stress thereon.

9. A packing compressing device comprising a coiled spring wound helically about the packing, means for rigidly holding one end of the spring, and an adjusting-screw connected to the opposite end of the spring.

10. In combination, a helically-arranged sectional packing member having a continuous helical groove or space of V shape in cross-section, a second member wedge-like in form fitting within said V-shape groove or space, a coiled spring wound on the second member, means for securing one end of the coiled spring, a stuffing-box within which the packing is contained, a bolt extending through the wall of the stuffing-box and connected to the opposite end of the spring, and an adjusting-nut on said bolt.

In testimony that I claim the foregoing as my own I have hereto affixed my signature in the presence of two witnesses.

CYRIL CHARLES MASON.

Witnesses:
RALPH SCOTT,
S. B. HODGE.